US007771097B2

(12) United States Patent

Buschmann

(10) Patent No.: US 7,771,097 B2

(45) Date of Patent: Aug. 10, 2010

(54) THREADED BASE LAMP ASSEMBLY

(75) Inventor: Jeffrey P. Buschmann, Lexington, KY (US)

(73) Assignee: OSRAM SYLVANIA Inc., Danvers, MA (US)

( * ) Notice: Subject to any disclaimer, the term of this patent is extended or adjusted under 35 U.S.C. 154(b) by 1324 days.

(21) Appl. No.: 11/113,564

(22) Filed: Apr. 25, 2005

(65) Prior Publication Data

US 2006/0238126 A1 Oct. 26, 2006

(51) Int. Cl.
*B60Q 1/00* (2006.01)

(52) U.S. Cl. .................. 362/519; 362/362; 362/296.01; 362/310; 362/640

(58) Field of Classification Search ................. 362/519, 362/362, 296, 310, 640
See application file for complete search history.

(56) References Cited

U.S. PATENT DOCUMENTS

| | | | | |
|---|---|---|---|---|
| 4,816,977 | A * | 3/1989 | Sorensen | 313/318.09 |
| 4,958,266 | A * | 9/1990 | Sorensen et al. | 362/310 |
| 5,465,025 | A * | 11/1995 | Hendrickson | 313/318.09 |
| 6,796,688 | B2 * | 9/2004 | Huang | 362/362 |
| 2003/0193806 | A1 * | 10/2003 | Morris | 362/310 |
| 2004/0246715 | A1 * | 12/2004 | Pearl | 362/226 |
| 2004/0252508 | A1 * | 12/2004 | Lin | 362/267 |
| 2005/0169016 | A1 * | 8/2005 | Li et al. | 362/655 |

* cited by examiner

*Primary Examiner*—Sandra L O'Shea
*Assistant Examiner*—Jessica L McMillan
(74) *Attorney, Agent, or Firm*—Edward S. Podszus

(57) ABSTRACT

A semi-standard threaded base lamp assembly may be formed with a substitutable optical housing. The assembly enables a standard set of components to be assembled as a threaded base lamp, but during construction any one of a variety of specialty reflector shells may be substituted in the assembly process to specialize the lamp for a particular market, need or interest.

20 Claims, 4 Drawing Sheets

THREADED BASE LAMP ASSEMBLY

BACKGROUND OF THE INVENTION

1. Field of the Invention

The invention relates to electric lamps and particularly to electric lamp assemblies. More particularly the invention is concerned with electric lamp assemblies with included shell bodies.

2. Description of the Related Art Including Information Disclosed Under 37 CFR 1.97 and 1.98

PAR lamps are commonly made with aluminized clear glass envelopes supported by a thread brass base. They are commonly used in indoor and outdoor fixtures without regard to esthetic appearance. Manufacturing lamps with reflectors having different colors, shapes, and other decorative aspects would be appealing in the market, but expensive in practice to make as each component would have to be performance qualified in the lamp assembly. Changes in market can be rapid, whereas redesign of manufacturing equipment is difficult and slow. There is then a need for a lamp assembly that enables rapid change in the lamp appearance, but allows a reasonably stable manufacture process.

BRIEF SUMMARY OF THE INVENTION

A lamp may be made from a light source having a first rigid lead and a second rigid lead, the light source being fixed in position relative to at least the first lead. A coupler is formed with a first passage and a second passage, and the light source is positioned relative to the coupler with the first lead and the second lead extended through the coupler passages. A threaded base is fixed to the coupler and has a first electrically conductive exterior contact point electrically coupled to the first lead and a second electrically conductive exterior contact point electrically coupled to the second lead and electrically insulated from the first contact point.

DETAILED DESCRIPTION OF THE INVENTION

Figure 1:
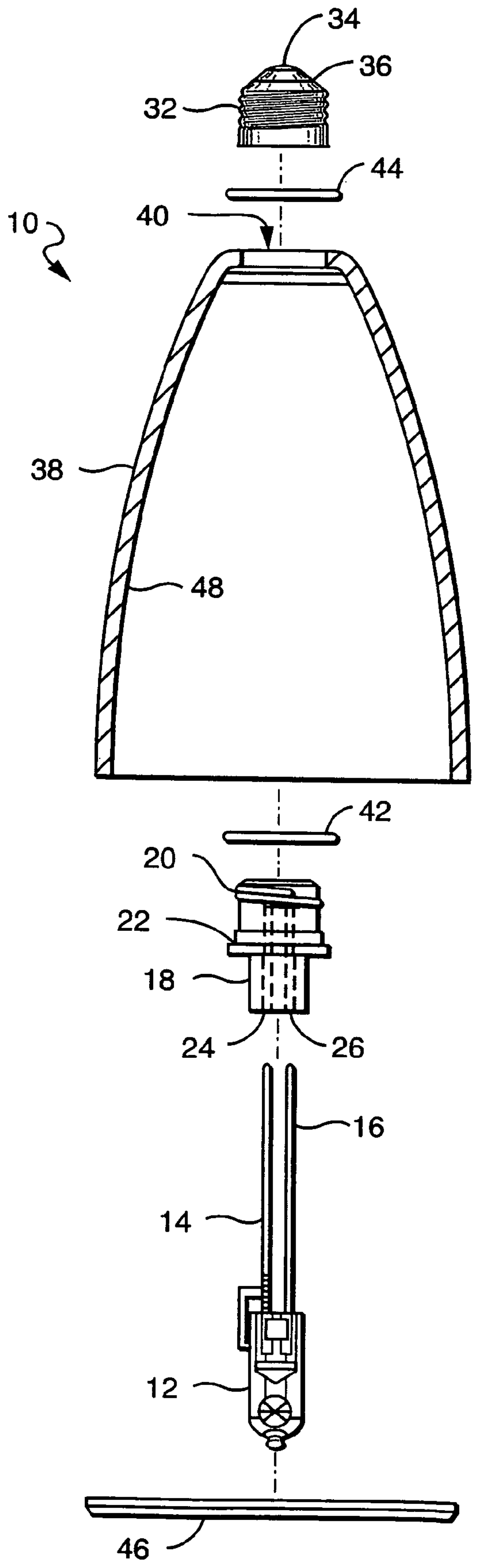
FIG. 1 shows an exploded view of a lamp assembly.
Figure 2:
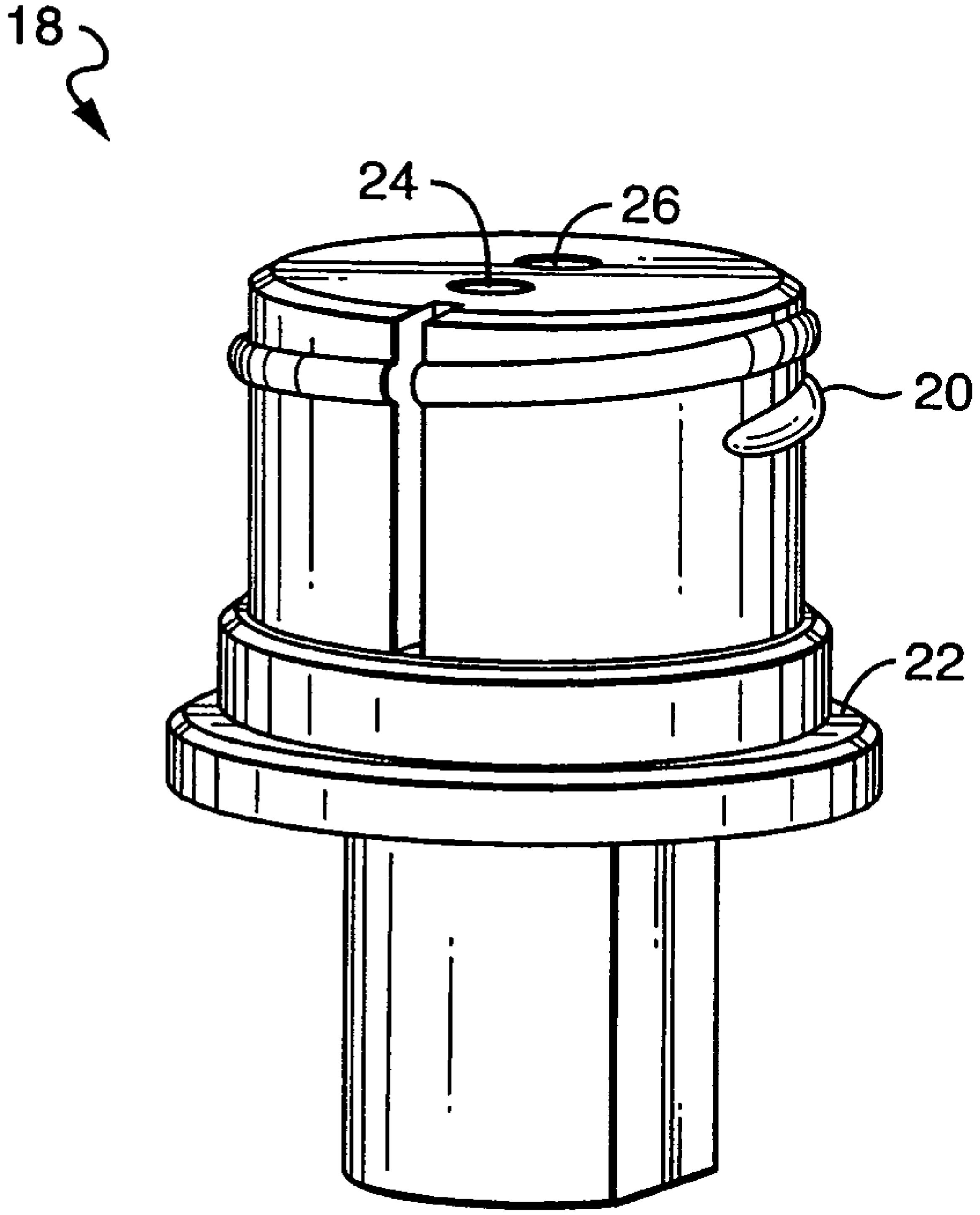
FIG. 2 shows a perspective view of the coupler.
Figure 3:
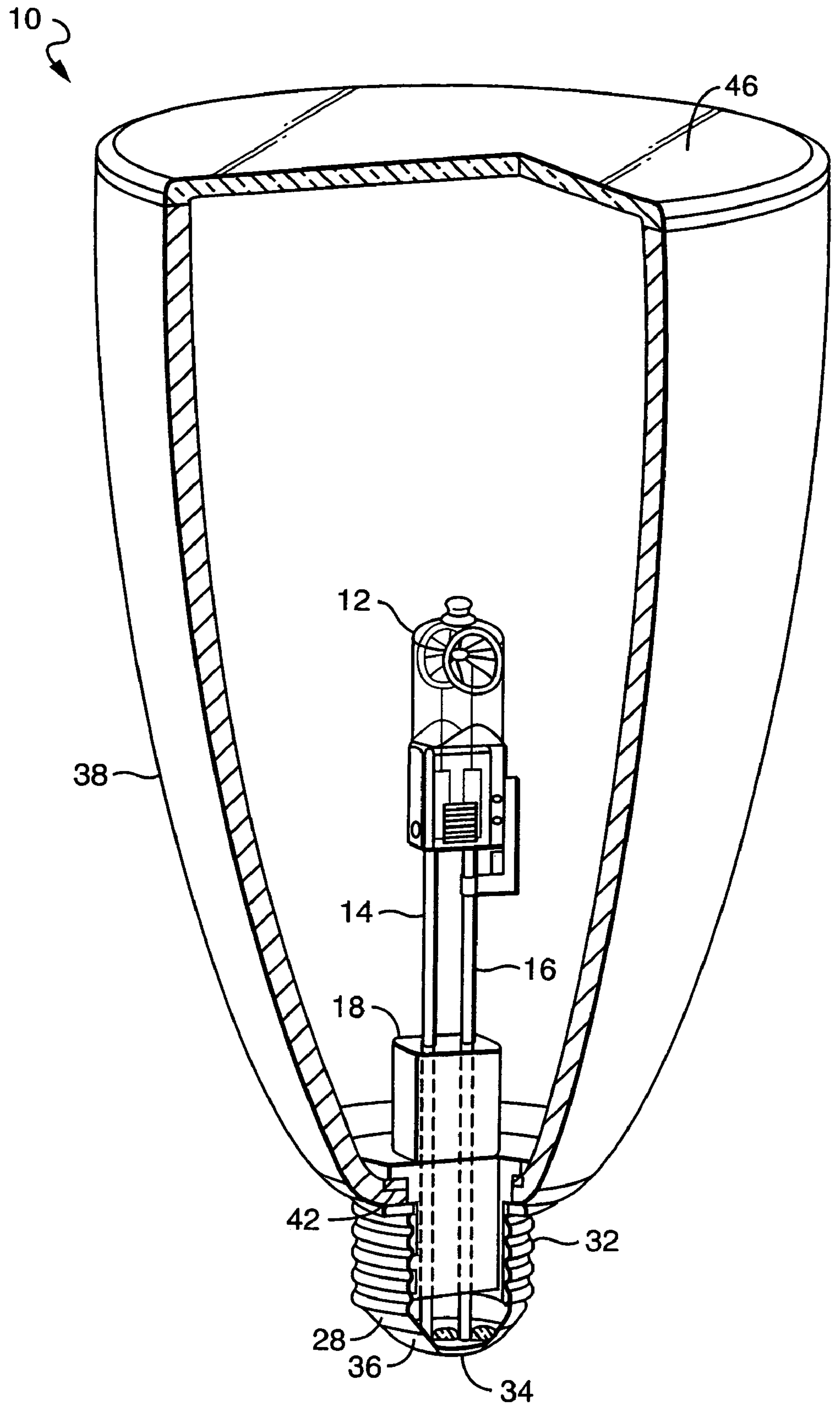
FIG. 3 shows sectional view of the assembled lamp.

The lamp 10 may be simply made from a light source 12, a coupler 18, a base 28, and a shell 38.

The preferred light source 12 is a press sealed tungsten halogen lamp with a first rigid lead 14 and a second rigid lead 16. The light source 12 may be fixed in position relative to at least the first lead 14 with a brace.

The preferred coupler 18 is formed from an electrically insulative material, such as ceramic, but could be made from plastic or other sufficiently rigid and electronically insulating material. The preferred coupler 18 is cylindrical with a latching structure 20 on a first end and a blocking face 22 on a second end. The preferred latching structure 20 is a threading, but may be a formed depression or protrusion that the base 28 may be fixed to, for example by peening the metal base 28 to the coupler 18. The preferred blocking face 22 is a radially extending flange, but may be any similar set of protrusions to block axial motion through a closely formed passage. The coupler 18 is further formed with a first passage 24 and a second passage 26. The passages 24, and 26 extend from the first end to the second end of the coupler 18. The light source 12 is positioned relative to the coupler 18 with the first lead 14 and the second lead 16 extended through the respective passages 24, 26. A snug fit between the leads 14, 16 and the respective passages 24, 26 is preferred to properly locate and stabilize the light source 12. The ceramic coupler 18 then centers the light source 12 with respect to the reflector shell 38. The coupler 18 electrically isolates the leads 14, 16, the base 28 and light source 12.

Figure 4:
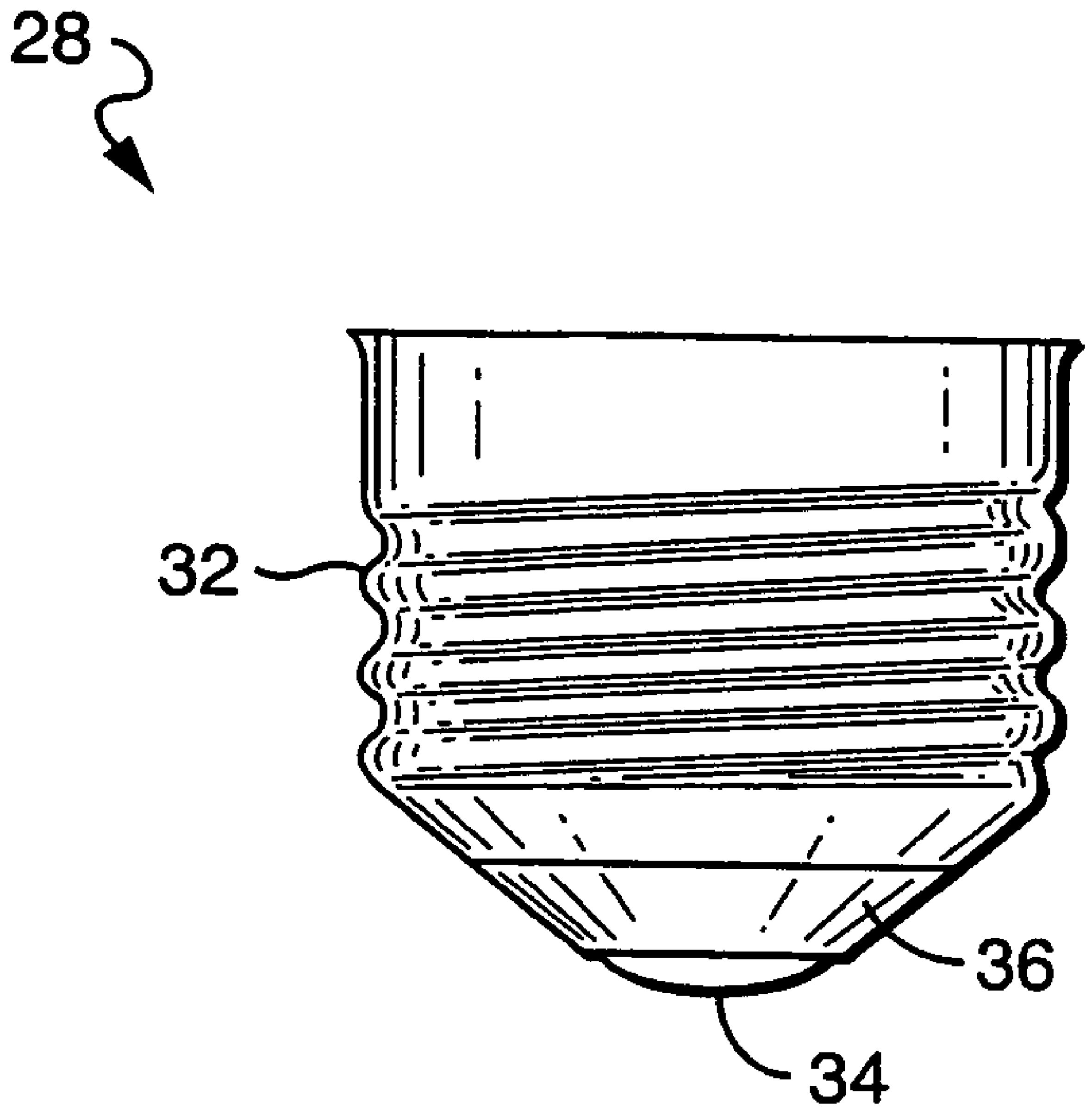
FIG. 4 shows a perspective view of a base.

FIG. 4 shows a perspective view of a base 28. The preferred threaded base 28 is a standard brass or aluminum threaded cup shaped base that is sized and shaped so as to be threadable into an appropriately sized lamp socket. The base 28 may be fixed to the coupler 18 by threading it onto the coupler 18 with or without glue, or alternatively by threading it in place and peening portions of the base 28 to lock with corresponding indents or protrusions formed on the coupler 18. The base 28 has a first electrically conductive exterior contact point 32, that is electrically coupled to the first lead 14 for example by welding or soldering. The base 28 also has a second electrically conductive exterior contact point 34 electrically coupled to the second lead 16, for example by welding or soldering. The first electrically conductive exterior contact point 32 and the second electrically conductive exterior contact point 34 are electrically insulated with respect to each other, for example by an intermediate glass gob 36.

The preferred reflector shell 38 forms an optical housing around the light source 12, and includes a defined housing passage 40. The coupler 18 extends through the housing passage 40, and the optical shell 38 is fixed between respective faces of the coupler 18 and threaded base 28. The blocking face 22 may abut a face edge of the shell passage 40 to fix the axial location of the coupler 18 in the shell 38. The shell 38 may include a mirrored or similar formed reflective surface 48 to project light received from the light source in a desired beam pattern. Alternatively, the shell 38 may include colored, decorated, artistically shaped or similarly specialized features.

The preferred lamp 10 includes a first fitting 42 intermediate the coupler 18 and the optical shell 38. The first fitting 42 may be a compressible ring positioned between and conforming to a face of the coupler 18 and a face of the shell 38, for example a high temperature nylon washer.

The preferred lamp may also include a second fitting 44 intermediate the threaded base 28 and the shell 38. Again, the second fitting 44 may be a compressible ring positioned between the blocking face of the threaded base 28 and a face of the optical shell 38, for example a high temperature nylon washer.

The lamp 10 is assembled by positioning the light source 12 leads 14, 16 in the coupler 18 passages 24, 26. This subassembly is then threaded through the defined passage in the shell 38 with (or without if preferred) the optional first fitting 42. The second fitting 44, if any, is assembled over the coupler 18 and adjacent the shell 38. The coupler 18 is then fixed to the base 28 from the other side of the shell 38, for example by threading the two together with glue, or peening the base 28 to fit to the coupler 18. This joining traps the shell 38 intermediate the coupler 18 and the base 28, with any included first fitting 42 or second fitting 44. In the preferred embodiment the intermediate fittings 42 and 44 are used to cushion the contacts between the coupler 18 and the shell 38 and between the base 28 and the shell 38, for example by using compressible washers as fittings.

The reflector shell 38 may be closed by an optional light transmissive lens 46. The lens 46 may be glued or melt fused to the shell 38 to enclose a cavity including the light source 12.

The assembly may be adapted for a variety of pre-made shells having a particular artistic, optical or other special reflector or shell feature. For example differing colors, optical surfaces, or other attributes may be molded in or otherwise made part of the shell. In this way a variety of special or small volume production lamps may be made only changing the single shell component. Soft glasses are the most readily adapted for such specialized shell construction, but are at the same time friable, scratchable or otherwise subject to injury in assembly. They can also have significant thermal expansion, making them difficult to build into standard lamp constructions. The preferred construction is then particularly useful when using a soft glass, such as a high expansion glass reflector (shell) since there is an opportunity that materials with differing thermal expansion rates and abrasive surfaces to come in contact with the soft glass reflector can result in glass failure. The coupler mechanically supports the reflector shell. The use of threads on the coupler reduces or eliminates the need to use adhesives to hold the assembled reflector and lamp. The threading to the base also provides the mechanical means to compress the reflector between the fittings or washers and the threaded metal base. While the assembly is oriented to small volume productions, it enables quickly variable constructions for particular, unique or artistic uses.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A lamp comprising:

a light source having a first rigid lead and a second rigid lead, the light source being fixed in position relative to at least the first lead;

a coupler formed with a first passage and a second passage, the light source positioned relative to the coupler with the first lead and the second lead extended through the respective first passage and second passage;

a threaded base fixed to the coupler and having a first electrically conductive exterior contact electrically coupled to the first lead and a second electrically conductive exterior contact electrically coupled to the second lead and electrically insulated form the first contact; and an optical housing defining a through passage, the coupler extending through the through passage, and the optical housing being held between the coupler and the threaded base by a connection formed between the coupler and the threaded base, said connection operative to prevent the optical housing separating from the coupler.

2. The lamp in claim 1, wherein at least one lead is snuggly fixed to the coupler.

3. The lamp in claim 2, wherein the second fitting is a compressible ring positioned and conforming to a face of the threaded base and a face of the optical housing.

4. The lamp in claim 1, wherein at least one lead is mechanically fixed to the base.

5. The lamp in claim 1, including a fitting intermediate the coupler and the optical housing.

6. The lamp in claim 1, including a fitting intermediate the threaded base and the optical housing.

7. The lamp in claim 1, wherein the housing is a reflector shell.

8. The lamp in claim 1, wherein the coupler is a ceramic body with a threading to couple internally in the threaded base and one or more obstructions facing the threading to mechanically block passage of the coupler through the optical housing.

9. The lamp in claim 1, wherein the coupler includes an indentation and a portion of the base is extended into the indentation to fix the coupler to the base.

10. The lamp in claim 1, wherein the coupler includes a protrusion and a portion of the base is formed around the protrusion to fix the coupler to the base.

11. The lamp in claim 1, wherein the first fitting is a compressible ring positioned and conforming to a between a face of the coupler and a face of the optical housing.

12. The lamp in claim 1, further including a light transmissive lens coupled to the shell enclosing the light source in a cavity defined by the shell and lens.

13. The lamp in claim 1, wherein the coupler has a latching structure (20) adapted to fix the coupler to the threaded base.

14. The lamp in claim 1, wherein the coupler has one or more obstructions (22) to block displacement of the coupler through the housing passage (40) of the optical housing.

15. A lamp comprising:

a light source having a first rigid lead and a second rigid lead, the light source being fixed in position relative to at least the first lead;

an electrically insulative coupler formed with a first passage and a second passage, the light source positioned relative to the coupler with the first lead and the second lead extended through the respective passages of the coupler;

a threaded base fixed to the coupler and having a first electrically conductive exterior contact point electrically coupled to the first lead and a second electrically conductive exterior contact point electrically coupled to the second lead and electrically insulated with respect to the first contact point; and a reflector shell forming an optical housing defining a housing passage, the coupler extending through the housing passage, and the optical housing being held between respective faces of the coupler and threaded base by a connection formed between the coupler and the threaded base;

a first fitting intermediate the coupler and the optical housing wherein the first fitting is a compressible ring positioned between and conforming to a face of the coupler and a face of the optical housing;

a second fitting intermediate the threaded base and the optical housing wherein the second fitting is a compressible ring positioned between a face of the threaded base and a face of the optical housing; and wherein the coupler comprises a ceramic body with a threading to couple internally to the threaded base, and further comprises one or more obstructions facing the threading providing the face to mechanically intercept the coupler when disposed in the housing passage with the optical housing.

16. A method of assembling a lamp comprising the steps of:

providing a light source (12) having a first rigid lead (14) and a second rigid lead (16), the light source being fixed in position relative to at least the first rigid lead;

providing a coupler (18) formed with a first passage (24) and a second passage (26) extending therethrough;

extending the first rigid lead (14) and the second rigid lead (16) through the respective first passage (24) and second passage (26) to position the light source (12) relative the coupler (18);

providing a reflector shell (38) comprising an optical housing defining an interior space adapted to receive the light source (12) and a light exit opening, the shell also defining a through passage (40) having a seating surface adapted to receive the coupler (18), said seating surface facing the interior space;

inserting the coupler (18) into the interior space from a direction of the light exit opening to abut the seating surface;

providing a threaded base (28) having a first electrically conductive exterior contact (32) and a second electrically conductive exterior contact (34) electrically insulated from the first conductive exterior contact (32);

fixing the threaded base (28) to the coupler (18) whereby the reflector shell (38) is held between the coupler (18) and the threaded base (28) and the first rigid lead (14) is electrically coupled to the first conductive exterior contact (32) and the second rigid lead (16) is electrically coupled to the second conductive exterior contact (34).

17. The method of claim 16, further comprising the step of providing the coupler with a blocking surface (22) that during the step of inserting the coupler into the interior space prevents further axial displacement past the seating surface.

18. The method of claim 16, further comprising the step of providing a resilient fitting (42, 44) positioned between a surface of the optical housing and a respective confronting surface of one or both of the coupler and the threaded base.

19. The method of claim 16, further comprising the step of providing a latching structure (20) on the coupler (18) to provide for fixing the threaded base (28) to the coupler (18).

20. The method of claim 19, wherein the step of providing the latching structure comprises providing a threading on the coupler.

* * * * *